United States Patent
Kato et al.

(10) Patent No.: US 7,243,563 B2
(45) Date of Patent: Jul. 17, 2007

(54) FRICTION APPLYING APPARATUS AND LINEAR GUIDE APPARATUS HAVING THE SAME

(75) Inventors: Soichiro Kato, Saitama (JP); Masaru Akiyama, Gunma (JP)

(73) Assignee: NSK, Ltd., Tokyo (JP)

( * ) Notice: Subject to any disclaimer, the term of this patent is extended or adjusted under 35 U.S.C. 154(b) by 411 days.

(21) Appl. No.: 10/247,587

(22) Filed: Sep. 20, 2002

(65) Prior Publication Data

US 2003/0062227 A1 Apr. 3, 2003

(30) Foreign Application Priority Data

Sep. 21, 2001 (JP) .................................. P.2001-290222

(51) Int. Cl.
*F16C 29/06* (2006.01)

(52) U.S. Cl. ........................................ 74/89.32; 384/40

(58) Field of Classification Search .................. 188/43, 188/67, 68, 170, 60; 74/89.32, 89.39; 384/40, 384/43, 45
See application file for complete search history.

(56) References Cited

U.S. PATENT DOCUMENTS

| | | | | |
|---|---|---|---|---|
| 3,609,078 A | * | 9/1971 | Carlos et al. | 508/454 |
| 3,620,976 A | * | 11/1971 | Wright et al. | 508/173 |
| 4,410,435 A | * | 10/1983 | Naka et al. | 508/440 |
| 4,773,770 A | * | 9/1988 | Osawa et al. | 384/45 |
| 5,273,367 A | * | 12/1993 | Tanaka | 384/45 |
| 5,366,298 A | * | 11/1994 | Toshimitsu et al. | 384/107 |
| 5,731,274 A | * | 3/1998 | Andrew | 508/272 |
| 5,878,849 A | * | 3/1999 | Prunier et al. | 188/251 A |
| 6,056,443 A | * | 5/2000 | Koike et al. | 384/296 |
| 6,082,527 A | | 7/2000 | Bruhmann et al. | |
| 6,139,413 A | * | 10/2000 | Sirany | 451/415 |
| 6,221,475 B1 | | 4/2001 | Domergue et al. | |
| 6,336,528 B1 | * | 1/2002 | Rudy | 188/43 |
| 6,561,049 B2 | * | 5/2003 | Akiyama et al. | 74/89.32 |
| 2001/0016087 A1 | * | 8/2001 | Akiyama et al. | 384/17 |

FOREIGN PATENT DOCUMENTS

| | | |
|---|---|---|
| DE | 197 50 599 A1 | 7/1998 |
| EP | 742 379 A1 | 11/1996 |
| EP | 0 976 945 A1 | 2/2000 |
| JP | 7-277844 A | 10/1995 |
| WO | 00/47911 A1 | 8/2000 |

* cited by examiner

*Primary Examiner*—Chris Schwartz
(74) *Attorney, Agent, or Firm*—Sughrue, Mion, PLLC

(57) ABSTRACT

A friction applying apparatus and a linear guide apparatus having the same, according to the present invention can uniformly contact allover contacting faces of sliding members to the contacted members so as to reduce abrasion in the sliding members and the contacted members, and may maintain appropriate frictional force and precision. In the friction applying apparatus forcing the sliding members moving along guide rails for generating friction, the sliding member is made of a material having elastic modulus being 5000 MPa or less and Vickers hardness being 400 or more.

19 Claims, 6 Drawing Sheets

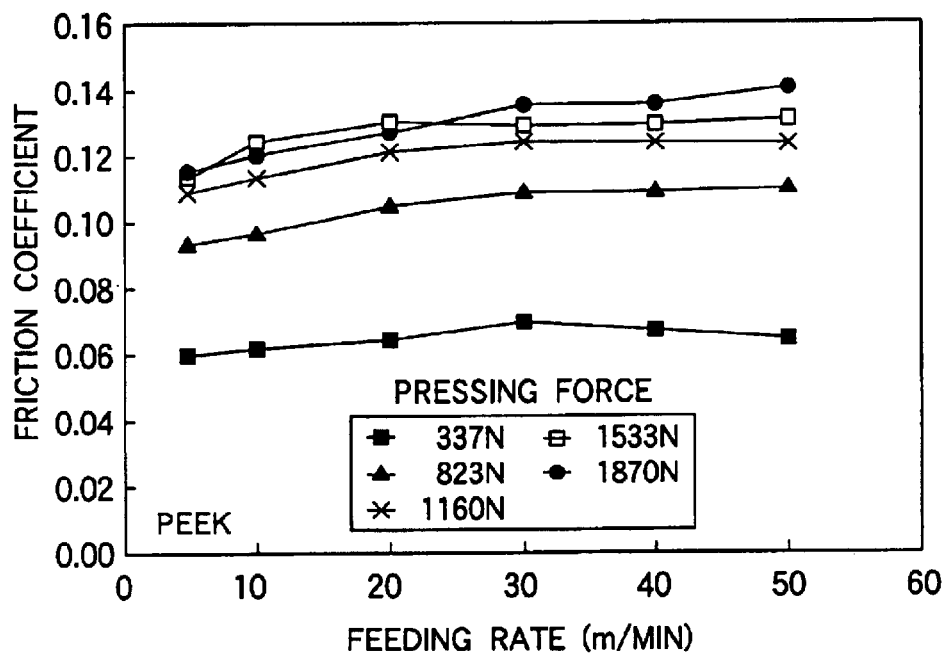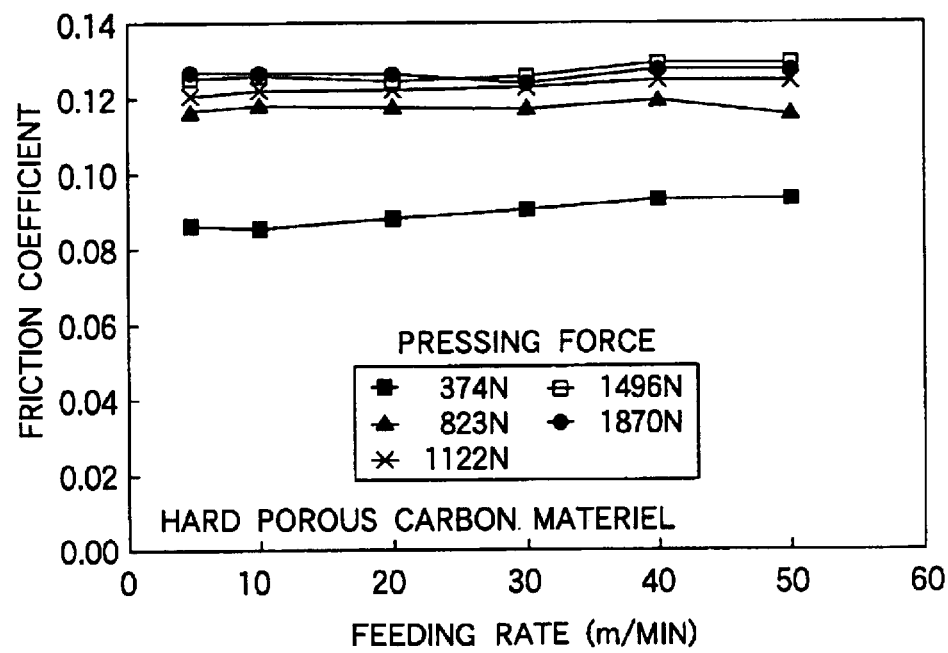

FIG.7A1
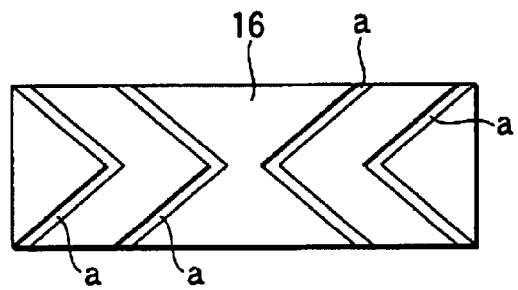
FIG.7B1
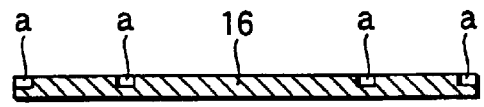
FIG.7A2
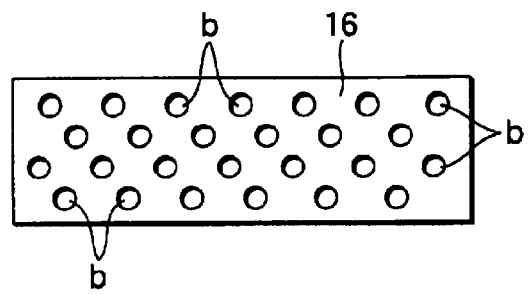
FIG.7B2
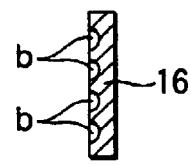
FIG.7A3
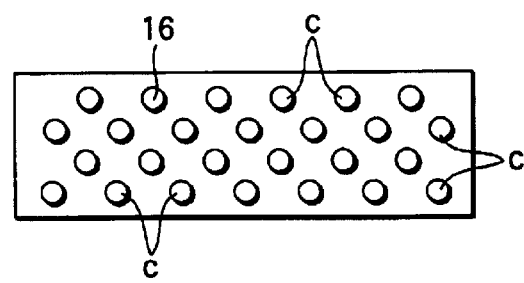
FIG.7B3
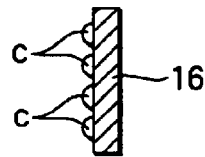

FRICTION APPLYING APPARATUS AND LINEAR GUIDE APPARATUS HAVING THE SAME

BACKGROUND OF THE INVENTION

The present invention relates to a friction applying apparatus which moves sliding members along contacted members such as guide rails, and generates friction by forcing the sliding members to the contacted members, and relates to a linear guide apparatus provided with the friction applying apparatus.

In a moving table incorporated in a machine tool or an industrial machine moving at relatively high speed by ball screws or linear motors, a linear guide apparatus has been used for guiding their movement.

This kind of linear guide apparatus comprises a guide rail extending in one direction and a slider in movable combination with the guiding rail, and the slider is mounted thereon with the moving table, so that the moving table moves along the guiding rail together with the slider.

The guiding rail is formed at its outside with rolling grooves for rolling elements. The slider at its inside surfaces with rolling grooves for the rolling elements that repectively opposite to the rolling grooves of the guide rail. The plurality of rolling elements such as balls are rotatably charged between the rolling grooves of the rail and the slider, so that the balls circulate therebetween in response to the movement of the slider relative to the guide rail.

The linear guide apparatus as mentioned above is equipped with the friction applying apparatus for heightening attenuation (rigidity) of the moving table. The friction applying apparatus comprises the sliding members furnished in opposition to the outer surfaces of the guiding rail as the contacted members and pressing units for urging the sliding members against the guiding rail, and the sliding members moves along the guiding rail together with the moving table.

When heightening attenuation of the moving table, the sliding member is pressed to the guiding rail by the pressing unit, and owing to friction force by pressing, vibration of the moving table is attenuated to increase rigidity.

As the sliding members of the friction applying apparatus, metals of sintered alloys of cast iron or copper group are generally employed, and in view of abrasion resistance, materials having hard quality are selected.

However, the hard material is ordinarily high in elastic modulus, and therefore, when pressing the sliding member to the guiding rail, it is difficult to uniformly contact an allover contacting face of the sliding member to the guiding rail, and actually its one-sided part of the contacting face has a partially high pressure and is earlier worn to shorten a serving life of the friction applying apparatus. Further, there is possibility that worn powders of the guiding rail or sliding member invade into the linear guide apparatus and cause obstacles in function of the linear guide apparatus.

SUMMARY OF THE INVENTION

The invention has been realized, paying attentions to such points, and it is an object of the present invention to offer a friction applying apparatus and a linear guide apparatus which uniformly contact the allover contacting face of the sliding members to the contacted members so as to reduce abrasion in the sliding member and the contacted member, and may maintain appropriate frictional force and precision.

The present invention set forth in the first aspect is a friction applying apparatus, forcing sliders moving along contacted members to press against the contacted members for generating friction, wherein a material of at least portion of a sliding member, said portion contacting the contacted member, is made of a material having elastic modulus being 5000 MPa or less and Vickers hardness being 400 or more.

The invention set forth in the second aspect is a friction applying apparatus, forcing sliders moving along contacted members to press against the contacted members for generating friction, characterized in that a material of at least portion of sliding member, said portion contacting the contacted member, is a porous ceramic.

The invention set forth in the third aspect is a friction applying apparatus as described in the second aspect, wherein in the porous ceramic is a hard porous carbon material.

The invention set forth in the fourth aspect is a friction applying apparatus as described in the first, second or third aspects, wherein in that pressing force of the slider to the contacted member is adjustable.

The invention set forth in the fifth aspect is a linear guide apparatus, provided with the friction applying apparatus as described in any of the first to fourth aspects.

In addition to this, the above-mentioned object may be achieved by a friction applying apparatus, according to the present invention, comprising:

a sliding member moved along a contacted member; and a press member pressing the sliding member against the contacted members so as to generate a friction between the sliding member and the contacted member, wherein at least a portion of the sliding member that are bought in friction contact with the contacted member is made of a material having elastic modulus being 5000 MPa or less and Vickers hardness being 400 or more.

Further, the object can also be achieved by a linear guide apparatus comprising the above-mentioned friction applying apparatus, according to the present invention.

Moreover, the object may be attained by a friction applying apparatus, according to the present invention comprising:

a sliding member moved along a contacted member; and a press member pressing the sliding member against the contacted members so as to generate a friction between the sliding member and the contacted member, wherein at least a portion of the sliding member that are bought in friction contact with the contacted member is made of a porous ceramic.

BRIEF DESCRIPTION OF THE DRAWINGS

FIGS. 6A to 6B are graphs showing the relation between feeding rates and friction coefficient of the sliding members; and FIGS. 7A1 to 7A3 and FIGS. 7B1 to 7B3 are modified examples of the sliding members, particularly, FIGS. 7A1, 7A2 and 7A3 are front views of the sliding members, and FIGS. 7B1, 7B2 and 7B3 are cross sectional views of the sliding members.

DETAILED DESCRIPTION OF THE PREFERRED EMBODIMENTS

Explanation will be made to embodiments of the present invention referring to the attached drawings as follows.

Figure 1:
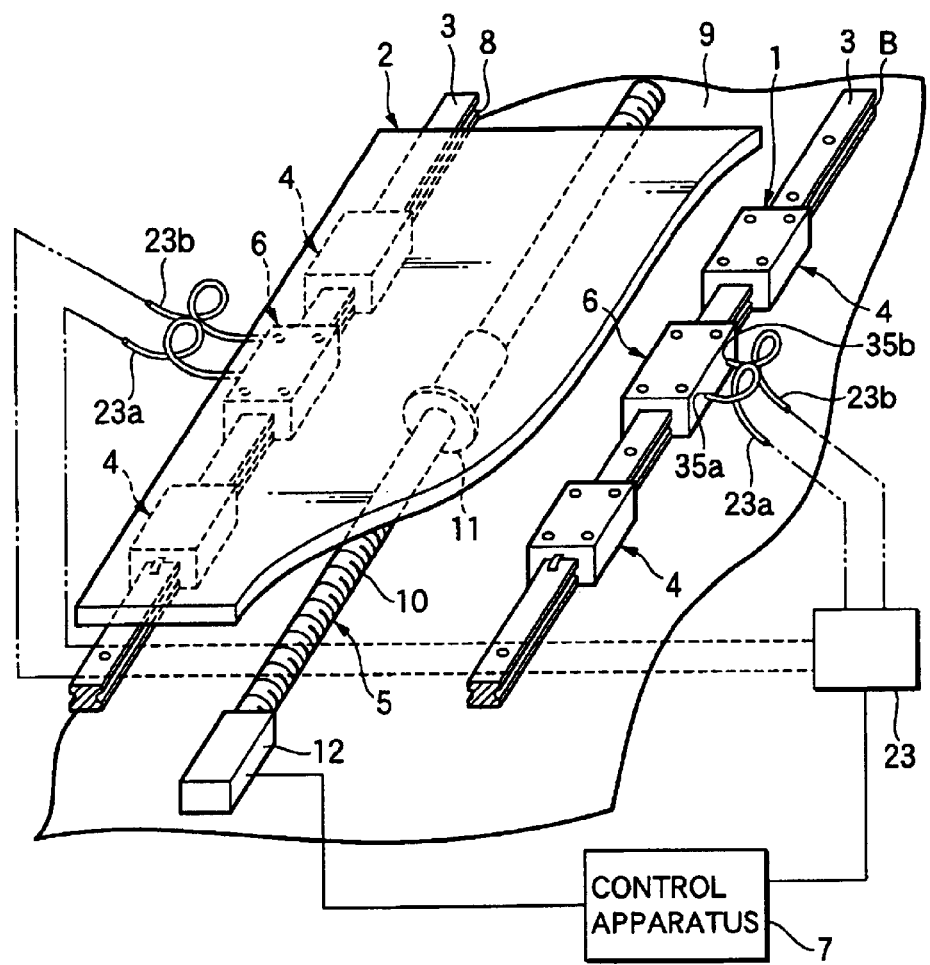
FIG. 1 is a perspective view showing one embodiment of the present invention.

FIG. 1 shows a structure for guiding movement of a moving table 2 by a linear guide apparatus 1 which comprises guiding rails 3 as contacted members and sliding members 4.

The guiding rails 3 extend in one direction, and are provided as a pair extended in parallel with each other. The guiding rails 3 are supplied to outer faces thereof with a lubricant as grease. Each of the guiding rails 3 is mounted on a bed 9 installed to such as a floor, and is provided in inner surfaces thereof with rolling grooves 8 arc-shaped in cross section extending in a longitudinal direction thereof.

The sliders 4 are coupled in a pair getting over the guiding rails 3, taking distances one another, and each of the sliders is movable along the longitudinal direction of the guiding rail 3. The moving table 2 is mounted on the sliders 4.

Each of the sliders 4 is provided at its inner surfaces with rolling grooves (not shown) that are respectively opposed to the rolling groove 8 that are provided at the outer surfaces of each of the guiding rails. Between the rolling grooves of each guiding rail and each slider 4, many balls (not shown) as rolling elements made of steel or ceramic are rotatably charged.

These balls circulate while rolling between a space defined between the rolling grooves of each guide rail and each slider 4 in response to movement of the sliders 4 relative to the guiding rails 3, whereby the sliders 4 and the table 2 smoothly move along the longitudinal direction of the guiding rails 3.

The moving table 2 is driven by a drive mechanism 5 which is provided with a screw shaft 10, a ball nut 11 and a motor 12 as a drive source. The screw shaft 10 has a thread groove on an outer circumference, and is turnably attached on the bed 9 as extending following the guiding rail 3. The ball nut 11 is screwed with the screw shaft 10 via many balls as the rolling elements, and is attached to the table 2.

The motor 12 is furnished to the bed 9 for turning the screw shaft 10 so as to move the table 2 via the ball nut 11 at predetermined speed along the guiding rails 3.

The moving table 2 is provided with the friction applying units 6 positioned between a pair of sliders 4, and the friction applying units 6 move in the longitudinal direction of the guiding rails 3 together with the moving table 2.

Figure 2:
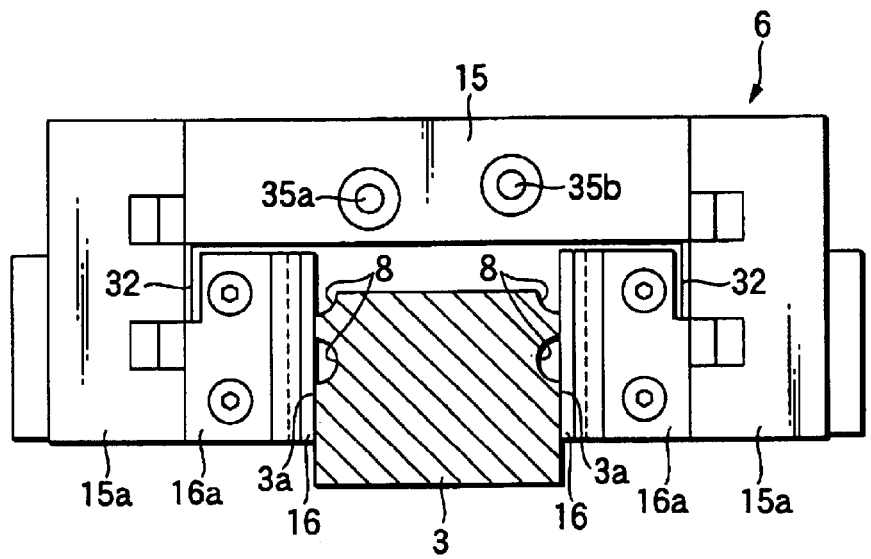
FIG. 2 is a front view of the friction applying apparatus in the embodiment.
Figure 3:
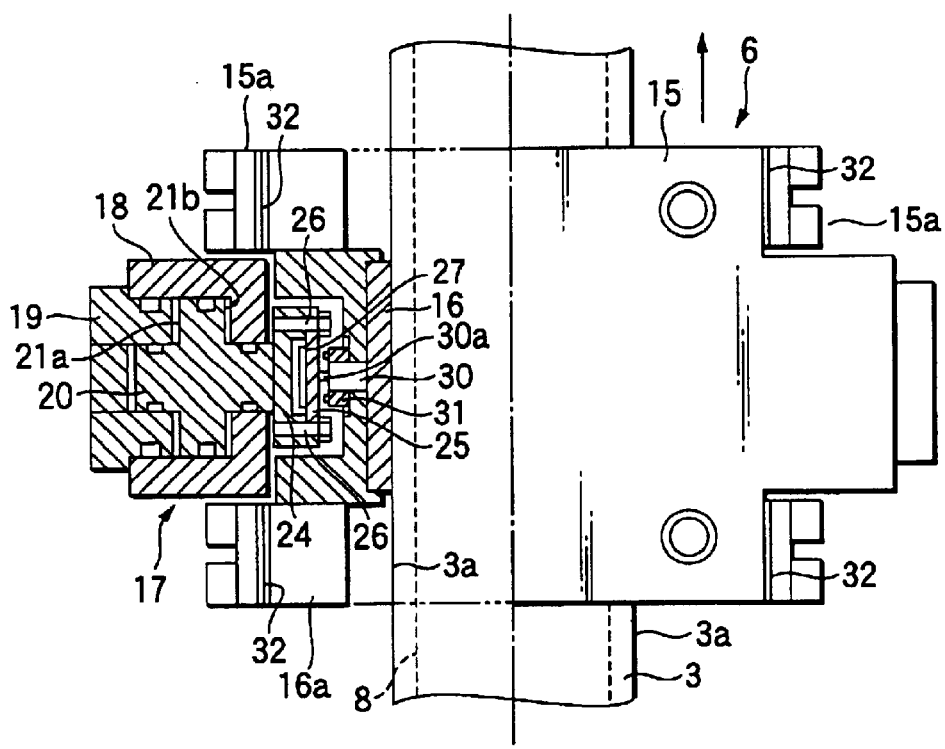
FIG. 3 is a plan view of the friction applying apparatus, partially in section.

Each of the friction applying units 6 is, as seen in FIGS. 2 and 3, provided with a unit main body 15, a sliding member 16 and a hydraulic cylinder 17 as a pressing unit. The unit main body 15 is coupled with the guiding rail 13 as getting thereover, and is unified with the moving table 2.

The unit main body 15 has both bottoms 15a opposite separating at both sides 3a of the guiding rail 3, and is provided with the sliding members 16 via holders 16a at insides of both bottoms 15a. The sliding members 16 are provided opposite at both sides 3a of the guiding rails 3, and are movably supported toward the sides 3a of the guiding rails 3 together with holders 16a.

The hydraulic cylinder 17 are provided at both bottoms 15a of the unit main body 15 so that the respective sliding members 16 can be pressed to both side faces 3a of the guiding rails 3.

Each of the hydraulic cylinder 17 has a cylinder member 18 penetrating through the bottom 15a of the unit main body 15, a cover member 19 enclosing an outside opening of the cylinder member 18, and a piston member 20 slidably mounted in the cylinder member 18.

There are provided a first oil room 21a between the piston member 20 and the cover member 19, and a second oil room 21b between the piston member 20 and the cylinder member 18. A pressing oil is supplied selectively through an oil supply unit 23 shown in FIG. 1 into the first and second oil rooms 21a, 21b.

When the oil is supplied into the first oil room 21a, the piston member 20 approaches, owing to pressure thereby, the side 3a of the guiding rails 3, and when the oil is supplied into the second oil room 21b, the piston member 20 separates, owing to pressure thereby, from the side 3a of the guiding rails 3.

The piston member 20 projects at one end from the cylinder member 18, at the projecting end face of which a case 24 dish-shaped in cross section is equipped as a pressure detector. A rectangular beam 25 is attached via bolts 26 for an opening of the case 24, and is equipped inside thereof with a strain gage 27 as a detector.

A screw axis 30 penetrates a tap hole of a holder 16a, and is screwed at its end with a nut 31, and the screw axis 30 is secured to the holder 16a by tightening the nut 31. The screw axis 30 is formed at an end with a projecting portion 30a to which an outer face of the beam 25 contacts.

Between the bottom 15a of the unit main body 15 and the holder 16a holding the sliding member 16, a plate spring 32 is furnished as a holding instrument, and the sliding member 16 is supported by the plate spring 32 to the bottom 15a of the unit main body 15 together with the holder 16a.

The holder 16a and the sliding member 16 are elastically biased by the plate spring 32 in a direction of separating from the side 3a of the guiding rails 3. The plate spring 32 is arranged at its plate face substantially in parallel to the side 3a of the guiding rails 3. The holder 16a and the sliding member 16 are supported with high rigidity in the other directions than the direction separating from the side 3a of the guiding rails 3, i.e., in the longitudinal direction and a vertical direction therewith.

The unit main body 15 is provided with a pair of the first and second oil supplies 35a, 35b to which hydraulic pipes 23a, 23b are connected from a hydraulic oil supply 23 as shown in FIG. 1.

When the oil is supplied from the hydraulic oil supply 23 through one hydraulic pipe 23a into the first oil room 21a, the piston member 20 moves owing to the hydraulic pressure in a direction approaching the sides 3a of the guide rails 3, and when the oil is supplied into the second oil room 21d through the other hydraulic pipe 23b, the piston member 20 moves in a direction where the piston member 20 separates from the side of owing to the hydraulic pressure.

Incidentally, when the oil is supplied into the first oil room 21a, the oil staying in the second oil room 21b is exhausted in response via an exhausting path (not shown), and when the oil is supplied into the second oil room 21b, the oil staying in the first oil room 21a is exhausted in response via an exhausting path (not shown).

A control apparatus 7 shown in FIG. 1 is an arithmetic processing unit (APU) for controlling the motor 12 of the drive mechanism, the feed rate of the moving table 2, the hydraulic oil supply 23 and the movement of the piston member 20 of the hydraulic cylinder 17.

When the piston member 20 of the hydraulic cylinder 17 goes back in the direction separating from the side 3a of the guiding rails 3, the sliding member 16 is supported by elasticity of the plate springs 32 under a non-pressing condition to the side 3a of the guiding rails 3. Accordingly, under this condition, responsibility of the movement of the moving table 2 driven by the drive unit 5 is maintained favorable.

When, from this condition, the oil is supplied by the hydraulic oil supply 23 into the first oil room 21a of the hydraulic cylinder 17 through the hydraulic pipe 23a, the piston member 20 moves, owing to the hydraulic pressure, in the direction approaching the sides 3a of the guide rails 3, and in company with this movement and via the beam 25, the sliding member 16 is pressed against elasticity of the plate spring 32. By this pressing force, the sliding member 16 is urged to the side faces 3a of the guiding rails 3, and during this period, frictional force is generated, and by this frictional force, the attenuation (rigidity) of the moving table 2 goes up. The frictional force of the sliding member 16 is adjusted by controlling the hydraulic supply apparatus 23 via the control apparatus 7.

When the sliding member 16 is pressed via the beam 25, a strain is caused in the beam 25 correspondingly to the pressing force, and magnification of the strain is detected by a strain gage 27 and a detected signal by the strain gage 27 is sent to the control apparatus 7.

Namely, the magnification of the pressing force to the sliding member 16 and timing of the pressing actuation are exactly grasped by the strain gage 27, and the grasped data are fed back to the control apparatus 7, thereby enabling to control frictional force of the sliding member 16 at high precision. As an instrument of indicating the pressing force of the sliding member 16, a load cell is available in substitution for the strain gage.

When the oil is supplied from the hydraulic oil supply 23b into the second oil room 21b of the hydraulic cylinder 17 through the hydraulic pipe 23b, the piston member 20 retreats in the direction separating from the side 3a of the guiding rails 3, and in company with this retreat, the pressing force on the sliding member 16 is released. In company with this release, the sliding member 16 is supported by elasticity of the plate springs 32 under a non-pressing condition to the side 3a of the guiding rails 3, and the frictional force between the sliding member 16 and the guiding rails 3 is reduced. Responsibility of the movement of the moving table 2 driven by the drive unit 5 is maintained favorable.

The piston member 20 is supported by the plate springs 32 because of not becoming resistance in the pressing direction but for keeping rigidity high in the moving direction of the friction applying apparatus 6.

The sliding member 16 is formed with a hard porous carbon material being a porous ceramic. The hard porous carbon material is made by impregnating phenol resin in vegetable based carbon material such as degreased rice bran, kneading into a predetermined shape, drying the shaped body, and carbonizing-baking above about 800° C. in a nitrogen atmosphere.

The hard porous carbon material is characterized in that Vickers hardness is 400 or higher having abrasion resistance almost equivalent to that of steel, and elastic modulus is 5000 MPa or less lower than that of metal.

Accordingly, when the sliding member 16 composed of the hard porous carbon material is pressed to contact the side faces 3a of the guiding rails 3 via the piston member 20, the contacting face to the side face 3a of the sliding member 16 is deformed moderately and elastically, the allover contacting face uniformly contact the side face, so that partial abrasion is prevented from the sliding member 16.

Therefore, the contacting members 16 and the guiding rails 3 can be suppressed from abrasion or damages over a long period, and can extend the lifetime as the friction applying apparatus, and since the abrasion or damages can be restrained, the linear guide is saved from lowering of the precision for a long time, enabling to maintain the linear guide function high precision. Further, worn powders can be controlled, enabling to avoid possibility spoiling the function of the linear guide.

Figure 4:
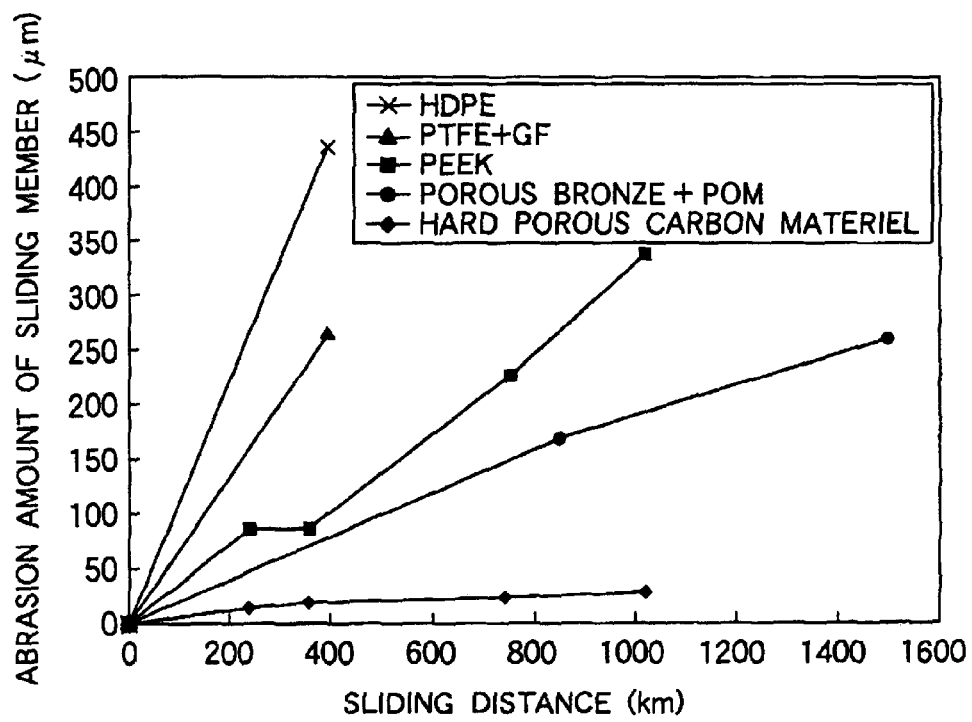
FIG. 4 is a graph showing the relation between sliding distances and abrasion amounts of sliding members.

FIG. 4 is concerned with durability of the sliding member made of the hard porous carbon material and shows evaluated results of tests in comparison with sliding members made of other materials. Comparison materials are PEEK (ploy etheretherketone), glass fiber reinforced PTFE (PTFE+GF), super high polymer polyethylene (HDPE), and a material having a surface of POM impregnated in porous bronze.

The test measured the abrasion amount (μm) of the sliding member to the sliding distance of the same. The conditions are:

Moving rate of the sliding member: 24 m/min
Contacting face pressure of the sliding member: 3.5 MPa
Moving stroke of the sliding member: 425 mm
Lubricant: lithium based grease.

As shown in FIG. 4, it is seen that the sliding member made of the hard porous carbon material can largely lighten the abrasion amount in comparison with sliding members of other materials.

It is assumed that conventionally, in case the sliding member is formed of a general high polymer material, variance of friction coefficient to the feed rate (speed of moving along the contacting member) exceeds 15%, and variance of the frictional force when pressing the sliding member for heightening the attenuation acts as disturbance on a pressure control apparatus, and gives bad influences to such as positioning.

Figure 5A:
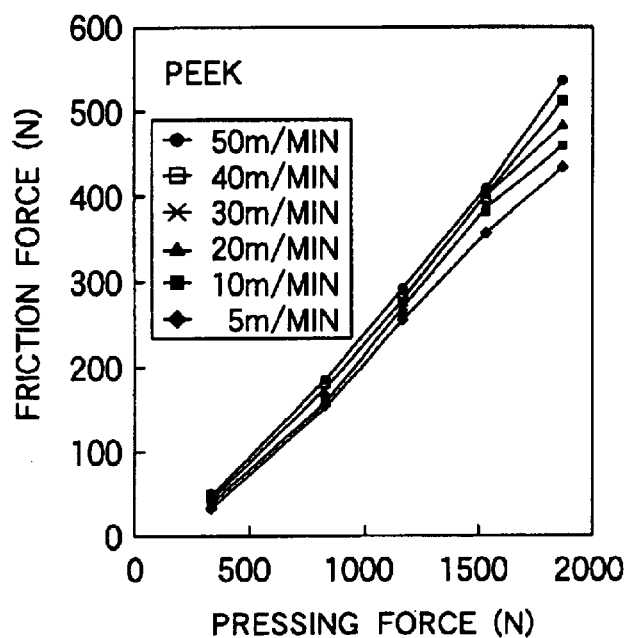
FIGS. 5A to 5B are graphs showing the relation between the pressing force and the abrasion force of the sliding members.
Figure 5B:
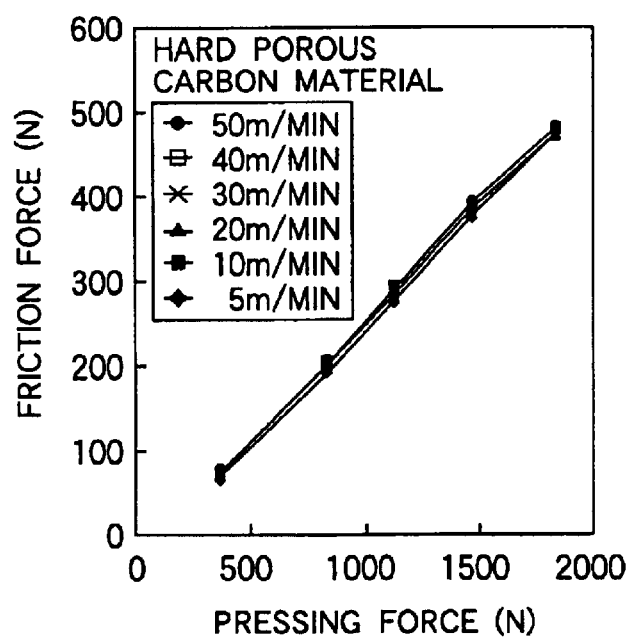

Herein, the feed rates of the sliding members are variously changed, and results of measuring the relation between the pressing force and the frictional force in each of the feed rates are shown in FIGS. 5A and 5B.

FIG. 5A is a case that the materials of the sliding members are PEEK (polyetherether ketone), and FIG. 5B is a case that the materials are the hard porous carbon materials. FIGS. 6A and 6B are that the measured results calculated in terms of the friction coefficient and the feed rates, and FIG. 6A is a case that the materials of the sliding members are PEEK (polyetherether ketone), and FIG. 6B is a case that the materials are the hard porous carbon materials.

As apparently from these drawings, in case the material of the sliding member, the variance of the friction coefficient owing to the variance of the feed rate is below 10%, and influences by the variance of the feed rate are scarcely seen, recognizing favorable stability of the friction coefficient.

Travelling lives of machine tools are different depending on usage, and in general about 5000 to 10000 km are reasonable values. For satisfying the frictional life in the travelling distance, since the face pressure of the sliding member is 0.1 to 4 MPa, it is desirable that the specific abrasion amount in this face pressure is $5 \times 10^{-7}$ to $2 \times 10^{-5}$ mm$^3$/N·Km or lower. The under Table 1 shows the specific abrasion amounts of the hard porous carbon material and other materials, and as shown in the same, the hard porous carbon material can satisfy the conditions.

TABLE 1

| Materials | Specific abrasion amount (mm$^3$/N · Km) |
|---|---|
| HDPE: | 3.24E$^{-04}$ |
| PTFE + GF: | 1.99E$^{-04}$ |
| PEEK: | 1.00E$^{-04}$ |
| Porous bronze + POM: | 4.93E$^{-05}$ |
| Hard porous carbon material: | 9.80E$^{-06}$ |

As to the sliding member, not limiting to the case of forming the overall body with the hard porous carbon material, only the portion contacting the contacting member may be made of the porous ceramic such as the hard porous carbon material, and other parts may be made of other materials.

Taking improvement of abrasion resistance or stability of the friction coefficient into consideration, it is possible to form V-bent grooves (a) on the surface contacting the contacting member of the sliding member as shown in FIGS. 7A-1 and 7B-1, plural dimple-like small concaves (b) uniformly as shown in FIGS. 7A-2 and 7B-2, otherwise a plurality of small hemispherical convexs (c) as shown in FIGS. 7A-3 and 7B-3.

Further, for adjusting the friction coefficient, it is sufficient that two kinds or more of materials are combined to structure the sliding member, for example, the hard porous carbon material as the porous ceramic are incorporated in the PEEK material.

According to the present invention as explained above, it is possible to lighten abrasion of the sliding members and the contacting members while keeping the contacting face pressure of the sliding members to the contacting members uniform, thereby enabling to heighten the endurance and maintain the precision proper.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A friction applying apparatus comprising:
   a sliding member moved along a contacted member;
   a press member pressing the sliding member against the contacted member so as to generate a friction between the sliding member and the contacted member,
   wherein at least a portion of the sliding member that is brought in friction contact with said contacted member is made of a material having elastic modulus being 5000 MPa or less and Vickers hardness being 400 or more,
   wherein a friction coefficient of the sliding member ranges from 0.08 to 0.13, and
   lubricant is disposed so as to lubricate between the sliding member and the contacted member,
   wherein said porous ceramic is a hard porous carbon material.

2. The friction applying apparatus according to claim 1, further comprising:
   an adjusting member adjusting a pressing force of the press member that applies the slider member against the contacted member.

3. The friction applying apparatus according to claim 2, wherein the entire portion is made of the material.

4. The friction applying apparatus according to claim 1, wherein said lubricant has a working temperature of less than about 400° C.

5. The friction applying apparatus according to claim 4, wherein said lubricant is a lithium-based grease.

6. The friction applying apparatus according to claim 1, wherein the entire portion is made of the material.

7. A linear guide apparatus comprising:
   the friction applying apparatus according to any one of claims 1, 2, 6, and 3.

8. A friction applying apparatus comprising:
   a sliding member moved along a contacted member;
   a press member pressing the sliding member against the contacted member so as to generate a fiction between the sliding member and the contacted member,
   wherein at least a portion of the sliding member that is brought in friction contact with said contacted member is made of a porous ceramic,
   wherein a friction coefficient of the sliding member ranges from 0.06 to 0.14, and
   lubricant is disposed so as to lubricate between the sliding member and the contacted member.

9. The friction applying apparatus according to claim 8, further comprising a means for stabilizing the friction coefficient between said sliding member and said contacted member, wherein said means for stabilizing the friction coefficient is disposed on said at least a portion of the sliding member.

10. The friction applying apparatus according to claim 9, wherein said means for stabilizing the friction coefficient comprises at least one V-bent groove.

11. The friction applying apparatus according to claim 9, wherein said means for stabilizing the friction coefficient comprises a plurality of dimple-shaped concaves.

12. The friction applying apparatus according to claim 9, wherein said means for stabilizing the friction coefficient comprises a plurality of hemispherical convexes.

13. The friction applying apparatus according to claim 8, further comprising a means for improving abrasion resistance, wherein said means for improving abrasion resistance is disposed on said at least a portion of the sliding member.

14. The friction applying apparatus according to claim 13, wherein said means for improving abrasion resistance comprises at least one V-bent groove.

15. The friction applying apparatus according to claim 13, wherein said means for improving abrasion resistance comprises a plurality of dimple-shaped concaves.

16. The friction applying apparatus according to claim 13, wherein said means for improving abrasion resistance comprises a plurality of hemispherical convexes.

17. The friction applying apparatus according to claim 8, wherein said lubricant has a working temperature of less than about 400 C.

18. The friction applying apparatus according to claim 17, wherein said lubricant is a lithium-based grease.

19. The friction applying apparatus according to claim 8, wherein said porous ceramic is a hard porous carbon material.

* * * * *